United States Patent [19]  [11] 3,828,310
Miller  [45] Aug. 6, 1974

[54] BICYCLE THEFT ALARM
[75] Inventor: Albert J. Miller, Campbell, Calif.
[73] Assignee: Bike Alarm, Ltd., San Mateo, Calif.
[22] Filed: June 5, 1972
[21] Appl. No.: 259,752

[52] U.S. Cl. ..................... 340/65, 340/280, 200/44
[51] Int. Cl. ............................................ B60r 25/10
[58] Field of Search ......... 340/63, 64, 65, 276, 280; 200/42, 44; 307/10 AT

[56] References Cited
UNITED STATES PATENTS
2,947,830  8/1960  Gross ............................... 340/65 X
3,673,562  6/1972  Buell ............................... 340/65 X
3,715,533  2/1973  Seaton ............................. 340/65 X FOREIGN PATENTS OR APPLICATIONS
482,168  9/1929  Germany ............................. 340/65

Primary Examiner—Alvin H. Waring
Attorney, Agent, or Firm—Harris Zimmerman

[57] ABSTRACT

A theft alarm system for warning of unauthorized use of a bicycle or similar movable article employs a pendulum switch to sense movement of the article. The switch actuates a warning alarm, which continues for a brief period upon each sensed movement. The device clamps to the protected article, and a padlock passed through an opening in the clamping member prevents loosening or removal of the device. A disarm switch to deactivate the device includes a moving arm which must traverse the padlock opening, preventing disarming of the system unless the padlock is first removed.

29 Claims, 6 Drawing Figures

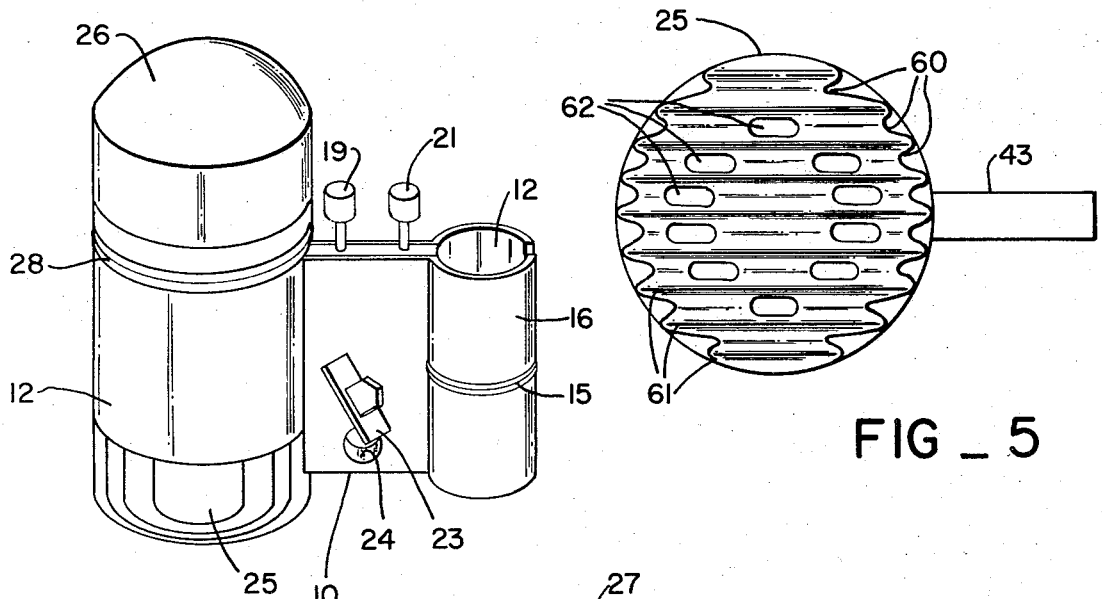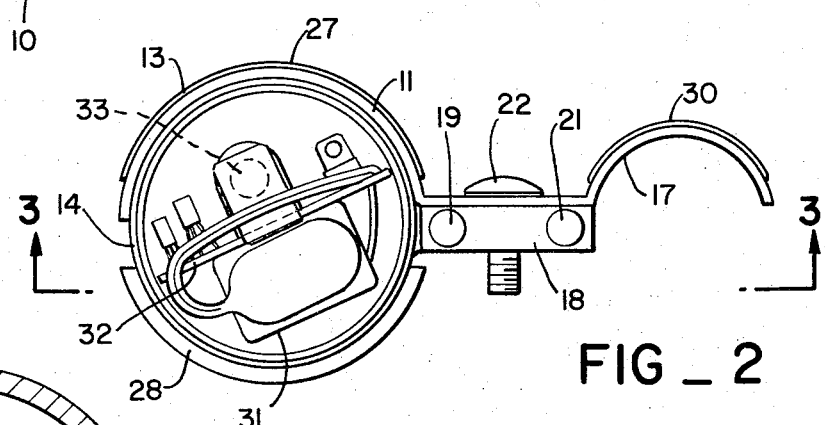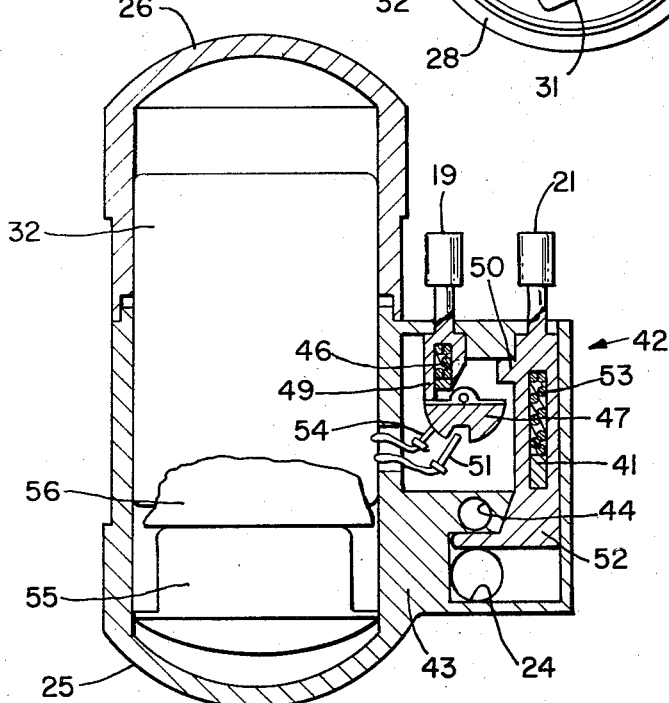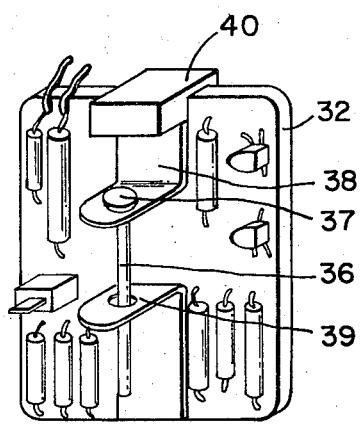

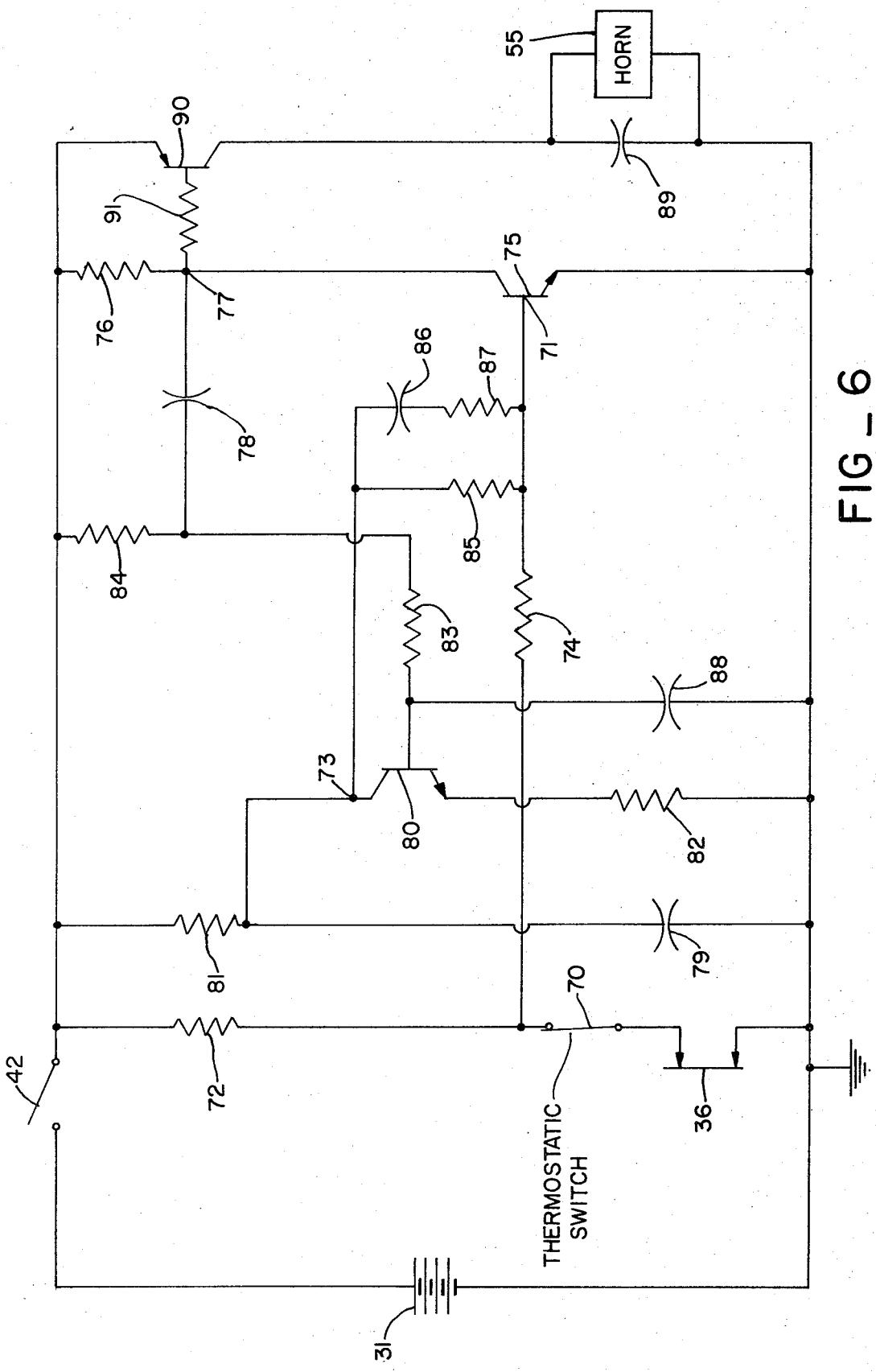
FIG_6

BICYCLE THEFT ALARM

BACKGROUND OF THE INVENTION

The modern growth of leisure-time activities, and the relatively recent increase in interest in recreation for health and physical fitness has led to an abundance of articles designed for these purposes. These articles, such as motorcycles, dune buggies, camping equipment, bicycles and the like, are characterized by their high cost and mobility, making them highly susceptible to theft. Indeed, the renewed popularity of bicycles has led to an increase in bicycle thefts that is becoming epidemic. The practice of securing a bicycle with a chain and lock has proven ineffective in halting thefts.

SUMMARY OF THE INVENTION

The present invention is a theft alarm designed to be employed with expensive and highly mobile articles, such as bicycles or the like. The device, once clamped to the article to be protected, cannot be removed except by the authorized user. When armed, the device will sense any movement of the article and emit a loud, jarring alarm, rendering any attempted theft obvious to the owner and any bystanders. The device is a closed hollow cylinder, containing a sound transducer, oscillator, pendulum switch, and battery, clamped to the protected article. A wing nut secures the clamp, and a padlock shackle passed through an aperture adjacent the nut prevents the loosening of the nut.

The device is armed by actuating a plunger which impinges on a switch toggle, switching on the sensing circuit. Thereafter any movement which causes the pendulum switch to open momentarily will actuate the alarm, which will continue for approximately 2 seconds. Continuing motion after that time will cause the alarm to continue. If motion has stopped, the alarm will cease. Thus incidental motion due to wind or accidental jostling will cause only a two second burst of the alarm. Disarming of the device can be accomplished only by actuating a separate disarm plunger, which impinges on the switch toggle and on another plunger, including a wiper arm which traverses the padlock aperture as the plunger translates. Therefore the alarm can be switched off only after the authorized user has removed the padlock from the aperture. Thus the padlock shackle serves both to prevent removal of the present invention from the protected articles, and to ensure that only the authorized user may disarm the device by first removing the padlock shackle from its aperture.

THE DRAWINGS

FIG. 1 is a perspective view of the device of the present invention;

FIG. 2 is a top view of the device, shown with the top end cap and front clamping bracket removed;

FIG. 3 is a sectional view of the device, taken along line 3—3 of FIG. 2;

FIG. 4 is a perspective view of the pendulum switch of the present invention;

FIG. 5 is a bottom view of the bottom end cap of the device; and

FIG. 6 is a schematic drawing of the circuitry employed in the sensing and alarm circuit of the present invention.

DESCRIPTION OF THE PREFERRED EMBODIMENT

The present invention is a theft-preventing alarm designed to be used to protect any portable article of worth. The embodiment shown in FIG. 1 and FIG. 2 comprises two clamping brackets 10 and 11 with curved opposing sections 12 and 13 respectively which encase a cylindrical metal cylinder 14. Each clamping bracket has similar curved sections 16 and 17 of smaller radius which act in concert to clamp the device to any tubular member, such as the frame of a bicycle. These sections 16 and 17 are reinforced by annular ridges 15 and 10. Also encompassed between the clamping brackets 10 and 11 is a switch box 18, which contains a switch to arm and disarm the sensing and alarm circuit. Plunger 19 acts to arm the circuit, and plunger 21 acts to disarm the circuit. A carriage bolt 22, received through coaxial apertures in the clamping brackets and the switch box, cooperates with an oversize wing nut 23 to secure the two clamping brackets tightly together. An aperture 24 through the clamping brackets and switch box and adjacent the carriage bolt and wing nut receives a shackle from a padlock. Because the wing portion of the wing nut 23 must pass over the aperture 24 as it is rotated to loosen the clamping brackets, the presence of a shackle in the aperture prevents removal of the alarm device from the protected article.

Permanently affixed to the lower end of the cylinder 14 is the bottom end cap 25, shown in greater detail in FIG. 5. The upper end of the cylinder 14 is sealed by a removable top end cap 26, which has an annular shoulder 29 in its lower extremity seating in raised annular portions 27 and 28 of the clamping brackets. The top end cap 26 is thus held in place by the clamping action of the brackets on the cap shoulder, preventing removal of the cap and access to the alarm circuit when the wing nut 23 secures the brackets tightly together. Within the cylinder 14 is the alarm circuit, comprising the battery 31, and the printed circuit board 32 mounting the elements of the alarm circuit. Also mounted on the circuit board is the motion sensing device 33, shown in greater detail in FIG. 4.

The motion sensing device of FIG. 4 is a pendulum-type float switch. It consists of a pendulum 36 with a rounded, enlarged head 37 suspended from an aperture in the float bracket 38. The pendulum depends through an aperture in the keeper bracket 39, and at rest contacts the edge of the aperture. The float bracket, pendulum and keeper bracket, all fabricated of electrically conductive metal, form a normally closed electrical switch, connected to the alarm circuit by the printed circuit on the other side of the circuit board. Motion imparted to the alarm device, such as by an attempt to carry away the protected article, will cause the pendulum to momentarily break contact with the keeper bracket. The electrical continuity will thus be broken, causing the alarm circuit, if armed, to actuate. Directly above the float bracket is secured a block 40, of plastic or the like. If the alarm device should be inverted upside down, the block 40 will prevent the pendulum from falling out of the aperture in the keeper bracket. The block will, in fact, allow the pendulum to remain functioning as a switch even in the inverted condition.

The unique arm and disarm functions of the present invention are detailed in FIG. 3. These functions are controlled by a switch 42, carried in a switch frame 43. The switch frame may be fabricated integrally with the bottom end cap, as shown, or may be a separate piece. Within the switch frame is a hole 24 to receive a padlock shackle therethrough. The hole 44, directly above, receives the carriage bolt therethrough. Also within the switch frame are channels formed by raised portions of the frame 41 to guide the moving parts which operate the switch 42.

The switch is placed in the ON position by actuation of the plunger 19, which carries an arm 49. As the plunger translates against the spring bias of spring 46, the arm 49 strikes the contact armature 47, and the armature rotates to the on position, contacting the wipers 51 and 54 and completing the alarm circuit. The plunger 19 is forced back to the extended position by spring 46. The alarm circuit is then armed, and any movement of the alarm device will cause an alarm to be given.

Disarming the system requires that plunger 20 be actuated, causing its protruding arm 50 to strike the armature. The armature will then move to the off position, opening the circuit between wipers 51 and 54 and disarming the circuit. As plunger 20 moves downward, however, it compresses spring 53 and causes right angular portion 52 to traverse the padlock aperture 24. If the authorized user of the protected article has placed a padlock shackle or other securable object through the hole 24, the arm 52 will be blocked, and the plunger arm 50 will not reach the armature. The alarm system will remain armed. Therefore the presence of a shackle in the hole 24 prevents anyone but the authorized user from both disarming the alarm circuit and removing or tampering with the alarm device.

Also shown in FIG. 3 is the horn 55 or other suitable sound transducer, seating within the bottom end cap 25. The circuit board 32 is just above the horn, separated from it by insulating material 56.

The alarm circuit of the present invention, shown in FIG. 6, is powered by the battery 31 through the arming switch 42. The circuit may be triggered by the opening of either the pendulum switch 36, or a thermosensitive switch 70. The switch 70 is included in the circuit to defeat any attempt to cut into the alarm device or to melt the alarm circuit, by opening and therefore actuating the alarm horn if the interior temperature becomes unusually high.

In the quiescent, non-alarm condition, switches 36 and 70 are closed, keeping junction 71 at ground potential. Transistor 75, biased by resistor 76, is non-conductive, due to the connection of its base to junction 71 through resistor 74, grounding it. Transistor 80, with its emitter-collector voltage biased by resistors 81 and 82, and its base connected to positive voltage through resistors 83 and 84, is conductive, and operating near saturation. Transistor 90, a PNP transistor, is held non-conductive by its base connection through resistor 91 to junction 77, applying a positive voltage to the base.

If an alarm condition is created by the opening of either the pendulum motion sensing switch or the thermosensitive switch, junction 71 will be raised from ground potential, and the resulting positive voltage applied from resistor 72 to the base of transistor 75 will cause it to turn conductive. As transistor 75 conducts, it causes junction 77 to decrease in potential, creating a negative voltage spike at junction 77. This negative spike is transmitted through resistor 91 to the base of transistor 90, causing it to become forward biased and conductive. As transistor 90 becomes conductive, it applies almost all of the battery voltage to the horn 55, causing a loud, jarring audio alarm signal. The capacitor 89, connected in parallel with the horn, smooths the voltage spikes generated by the horn, and helps reduce noise within the alarm circuit.

The negative voltage pulse created at junction 77 is also transmitted through capacitor 78 and resistor 83 to the base of transistor 80, causing that transistor to reverse bias and turn non-conductive. As transistor 80 turns off it creates a path through resistor 81, junction 73, and resistor 85 which allows bias current to latch transistor 75 in saturation. This keeps transistor 90 forward biased, continuing actuation of the horn. At the same time capacitor 78 is receiving a positive charge through the large resistor 84. When this charge reaches a sufficient positive potential, it acts through resistor 83 to forward bias transistor 80, turning it on again. This action reduces the potential at junction 73 almost to ground, removing the latch condition for transistor 75. The negative potential at junction 73 charges capacitor 86 negatively and also reverse biases transistor 75, turning it off. The non-conductance of transistor 75 raises the potential of junction 77, causing transistor 90 to turn off, and ending actuation of the horn. Thus the resistor 84 and the capacitor 78 form an RC timing circuit which controls the alarm portion of the cycle. Nominally, the component values will yield an alarm-on time of 1-2 seconds.

It should be noted that the negative charge on capacitor 86 prevents immediate re-actuation of transistor 75. Because of this, the capacitor 86 in conjunction with resistors 85, 87, 81 and 74 form an RC timing circuit which controls the minimum off time of the alarm signal. If, after the negative charge has leaked from capacitor 86, the switches 70 and 36 are again closed, the alarm will remain in its quiescent condition, and the alarm cycle will not continue. If one or both of the switches remain open, the cycle will start anew. The capacitors 79 and 88, in conjunction with capacitor 89 and resistor 82, provide important noise filtering to eliminate noise generated by the horn from disrupting the circuit operation.

The intermittent, cyclical operation of the alarm circuit is particularly desirable for the present invention. The light, portable articles which this invention is designed to protect are subject to incidental motions which may open the pendulum float switch, even though no theft is being attempted. The cyclical alarm circuit responds with only a single, short burst to such motion.

Also, because of the proximity of the horn to the pendulum switch, the horn may cause vibrations of such magnitude in the pendulum that the horn, once actuated, would continue to operate by vibrating the pendulum switch open and closed. This problem is eliminated by the minimum off time determined by capacitor 86 and its associated resistors.

The cyclical alarm circuit also ensures that thefts will be prevented by producing a loud, jarring intermittent sound that easily stands out from background noise.

The bottom end cap 25 shown in FIG. 5 is integrally molded in one piece with the switch frame 43. The cap portion 25 has deep parallel grooves 60 and ridges 61 therein. Within the grooves 60 are slots 62 through the cap. These slots, directly below the diaphragm of the horn, allow the audible alarm signal to escape easily. The ridges give strength and rigidity to the cap, and protect the slots from external foreign matter.

I claim:

1. A theft preventing alarm system for a valuable article comprising:

housing means for housing the elements of said alarm system;

clamping means for attaching said housing means to said valuable article;

arming switch means for arming and disarming said alarm system;

motion sensing means for sensing movement of said valuable article and generating an alarm actuating signal responsive to said movement;

alarm means, connected to said motion sensing means, for generating an alarm signal upon receiving said alarm actuating signal; and security means, operatively associated with said switch means and said clamping means for simultaneously preventing the disarming of said alarm system and the release of said clamping means from said valuable article.

2. The alarm system of claim 1 wherein said motion sensing means comprises a pendulum switch.

3. The alarm system of claim 2 wherein said pendulum switch includes an elongated rod depending through an aperture in a pendulum bracket, said rod having an enlarged upper end larger than said aperture and resting in a pendular manner on said enlarged upper end.

4. The alarm system of claim 3 wherein said pendulum switch includes a keeper bracket having an opening, the lower end of said rod depending through said opening and moving freely within said opening.

5. The alarm system of claim 4, wherein said pendulum bracket, said rod, and said keeper bracket form a normally closed electrical switch, said switch being opened by motion imparted to said alarm system, thereby generating an alarm actuating signal.

6. The alarm system of claim 1, wherein said alarm means comprises sound transducer means for generating an audible signal, and alarm circuit means to operate said sound transducer means.

7. The alarm system of claim 6, wherein said alarm circuit means includes an interrupter for turning off said sound transducer after a preset time interval.

8. The alarm system of claim 7, wherein said interrupter comprises an astable multivibrator which operates cyclically upon receipt of said alarm actuating signal to actuate said sound transducer means for a first predetermined period, and to deactuate said sound transducer means for a second predetermined period during which said second period said alarm actuating signal cannot cause reactuation of said sound transducer means.

9. The alarm system of claim 1 wherein said clamping means includes clamping brackets to clamp to said valuable article.

10. The alarm system of claim 9 wherein said clamping brackets comprise parallel brackets with first opposed convex portions to clamp onto a member of said valuable article.

11. The alarm system of claim 10, wherein said parallel brackets have second opposed convex portions to encompass said housing means in a tamperproof configuration.

12. The alarm system of claim 11, wherein said parallel brackets have first colinear apertures receiving therethrough means to maintain said brackets tightly together.

13. The alarm system of claim 12, wherein said means to maintain said brackets tightly together comprises a bolt and a nut threaded tightly onto said bolt.

14. The alarm system of claim 13, wherein said security means includes second colinear apertures through said brackets and adjacent said first colinear apertures, said second colinear apertures receiving a security member therethrough to interfere with and prevent rotation of said nut.

15. The alarm system of claim 1 wherein said arming switch means includes an arming plunger to arm said system and a disarming plunger to disarm said system.

16. The alarm system of claim 15, said arming switch means further including contact wipers, and a contact armature rotatable from a position of non-bridgement of said contact wipers when said system is disarmed to a position of bridgement of said contact wipers, completing a circuit and causing said alarm system to be armed.

17. The alarm system of claim 16 wherein said arming plunger when actuated causes rotation of said contact armature to a position of bridgement of said contact wipers, and said disarming plunger, when actuated, causes rotation of said contact armature to a position of nonbridgement of said contact wipers.

18. The alarm system of claim 17 wherein said disarming plunger includes an arm projecting from said plunger.

19. The alarm system of claim 18 wherein said security means includes a hole through said arming switch means, the projecting arm of said disarming plunger, when said plunger is actuated, traversing the axis of said hole.

20. The alarm system of claim 19, wherein said security means includes a security member received through said hole to interfere with and block said projecting arm of said disarming plunger, preventing actuation of said disarming plunger and disarming of said alarm system.

21. The alarm system of claim 20, wherein said security member is the shackle of a padlock.

22. The alarm system of claim 20 wherein said clamping means includes clamping brackets to join said alarm system to said valuable article.

23. The alarm system of claim 22, wherein said clamping brackets are held together by a bolt and a nut threaded tightly onto said bolt.

24. The alarm system of claim 23 wherein said security means includes said hole extending through said clamping brackets adjacent said bolt and nut.

25. The alarm system of claim 24 wherein said security member interferes with and blocks rotation of said nut, preventing loosening of said nut and removal of said alarm system from said valuable article.

26. The alarm system of claim 25, wherein said valuable article is a bicycle.

27. The alarm system of claim 25, wherein said motion sensing means comprises a pendulum switch.

28. The alarm system of claim 6, wherein said alarm circuit means includes a thermostatic switch to cause actuation of said alarm circuit upon sensing a temperature greater than a predetermined maximum temperature.

29. The alarm system of claim 27, wherein said alarm means includes a horn for producing an audible signal, and astable multivibrator means for intermittently actuating said horn upon continued reception of said alarm actuating signal.

* * * * *